(12) United States Patent
Terayama et al.

(10) Patent No.: US 7,555,967 B2
(45) Date of Patent: Jul. 7, 2009

(54) SHIFT CONTROL APPARATUS FOR AUTOMATIC TRANSMISSION

(75) Inventors: Hiroshi Terayama, Wako (JP); Koichi Hasegawa, Wako (JP); Yoshiyuki Kokubo, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 442 days.

(21) Appl. No.: 11/584,551

(22) Filed: Oct. 23, 2006

(65) Prior Publication Data

US 2007/0099751 A1 May 3, 2007

(30) Foreign Application Priority Data

Oct. 31, 2005 (JP) ............................. 2005-316420

(51) Int. Cl.
*F16H 59/46* (2006.01)
(52) U.S. Cl. .......................... 74/336 R; 477/97; 701/52
(58) Field of Classification Search .................... 74/900
See application file for complete search history.

(56) References Cited

U.S. PATENT DOCUMENTS 6,076,414 A * 6/2000 Tabata et al. .................. 74/335

FOREIGN PATENT DOCUMENTS

| JP | 2000-283281 | 10/2000 |
| JP | 2002-147588 | 5/2002 |

* cited by examiner

*Primary Examiner*—Charles A Marmor
*Assistant Examiner*—Edwin A. Young
(74) *Attorney, Agent, or Firm*—Squire, Sanders & Dempsey L.L.P.

(57) ABSTRACT

A shift control apparatus for an automatic transmission having an automatic shift mode for performing a shift operation by determining a gear ratio to be set according to a vehicle running condition and a manual shift mode for performing a shift operation instructed by a manual operation by an operator. The shift control apparatus includes a vehicle speed comparing unit for comparing a vehicle speed at the time of inputting a first manual shift command for downshift to a predetermined gear ratio in the manual shift mode and a vehicle speed at the time of inputting a second manual shift command for downshift during a first shift control period from the time of inputting the first manual shift command to the time of completing first shift control according to the first manual shift command, and a successive shift allowing unit for allowing the downshift by the second manual shift command when the vehicle speed comparing unit has determined that the vehicle speed at the time of inputting the second manual shift command is lower than the vehicle speed at the time of inputting the first manual shift command.

2 Claims, 13 Drawing Sheets

SHIFT CONTROL APPARATUS FOR AUTOMATIC TRANSMISSION

BACKGROUND OF THE INVENTION

1. Field of the Invention

The present invention relates to a shift control apparatus for an automatic transmission having an automatic shift mode and a manual shift mode.

2. Description of the Related Art

Shift control in an automatic transmission for a vehicle is usually performed according to a shift characteristic map for setting gear positions according to vehicle running conditions. In this shift control, each vehicle running condition according to which gear shift is performed is uniquely defined, so that flexibility in gear shift is low and it is difficult for an operator to determine when a shift operation has been performed during running. In this respect, there has recently been commercially available a vehicle mounting an automatic transmission having a manual shift mode where a shift operation can be performed also by a manual operation by the operator.

Generally in such an automatic transmission, a manual range is additionally set at a shift position of a shift lever to be operated by the operator, and every time an upshift command or a downshift command is output by the operation of the shift lever in the manual range, the present gear position in the automatic transmission is sequentially shifted to higher gear positions or lower gear positions.

Further, there has been proposed in Japanese Patent Laid-Open No. 2000-283281 or 2002-147588 an automatic transmission having a manual shift mode where upshift or downshift is allowed according to operator's desire by depressing a switch provided on a steering wheel during running in a drive range (D range) of the automatic transmission.

Thus, the automatic transmission described in Japanese Patent Laid-Open No. 2000-283281 or 2002-147588 includes a shift control apparatus allowing upshift or downshift by a switch operation during running in the D range, so that the operator can enjoy driving in the manual shift mode according to operator's desire. However, in this prior art shift control apparatus for the automatic transmission, fine control in shifting from the automatic shift mode to the manual shift mode has not been disclosed. Accordingly, the operator cannot enough enjoy manual-like driving faithful to operator's desire in the manual shift mode.

In the shift control apparatus for the automatic transmission described in Japanese Patent Laid-Open No. 2002-147588, the condition for return from the manual shift mode to the automatic shift mode is composed of three conditions that the lateral acceleration (lateral G) is less than or equal to a predetermined value, that the vehicle is not during inertial running, and that the vehicle speed is greater than or equal to a predetermined speed. However, these conditions for return to the automatic shift mode are susceptible to consideration from the viewpoint of smooth mode shifting.

SUMMARY OF THE INVENTION

It is therefore an object of the present invention to provide a shift control apparatus for an automatic transmission which can prevent the generation of an excessive deceleration feel when a manual shift command for downshift is input twice in succession.

In accordance with an aspect of the present invention, there is provided a shift control apparatus for an automatic transmission including an automatic shift mode for performing a shift operation by determining a gear position or gear ratio to be set according to a vehicle running condition and a manual shift mode for performing a shift operation instructed by a manual operation by an operator, the shift control apparatus including vehicle speed comparing means for comparing a vehicle speed at the time of inputting a first manual shift command for downshift to a predetermined gear position or gear ratio in the manual shift mode and a vehicle speed at the time of inputting a second manual shift command for downshift in the same direction as that of the first manual shift command during a first shift control period from the time of inputting the first manual shift command to the time of completing first shift control according to the first manual shift command; and successive shift allowing means for allowing the downshift by the second manual shift command when the vehicle speed comparing means has determined that the vehicle speed at the time of inputting the second manual shift command is lower than or equal to the vehicle speed at the time of inputting the first manual shift command.

According to the above aspect of the invention, double (two-step) downshift is allowed in only a vehicle speed region where a deceleration feel does not become excessive, so that the generation of an excessive deceleration feel due to the downshift by an unintentional manual shift command is prevented.

Preferably, the manual shift mode includes a first manual shift mode for performing a shift operation instructed by a manual operation such that a manual shift range is selected by the operator and an upshift switch or a downshift switch is operated by the operator in the manual shift range; and a second manual shift mode for performing a shift operation instructed by a manual operation such that an automatic shift range is selected by the operator and the upshift switch or the downshift switch is operated by the operator in the automatic shift range; the successive shift allowing means operating in the second manual shift mode.

Thus, the manual shift mode is composed of the first mode capable of highly responding to operator demands and the second mode capable of sufficiently responding to operator demands, thereby widening the range of choice to the vehicle operation.

More specifically, the first manual shift mode is a mode where the manual shift range is first selected by the operator and the upshift switch or the downshift switch is next operated, so that this mode can respond to operator demands to the maximum extent. Accordingly, the first manual shift mode can respond to operator demands in a vehicle speed region where engine stall and engine over-revolution can be prevented.

In contrast, the second manual shift mode is a mode where the automatic shift range is first selected by the operator and the upshift switch or the downshift switch is next operated, so that this mode can respond to operator demands to some extent.

When the present vehicle speed is lower than or equal to the vehicle speed at the time of inputting the first downshift command in the second manual shift mode, successive downshift is allowed. In the case that the present vehicle speed during downhill running for example becomes higher than the vehicle speed at the time of performing the first downshift, there is a possibility that the next downshift may cause the approach to engine over-revolution and that an excessive deceleration feel may be given. To eliminate this possibility, the present gear position or gear ratio is maintained to continue deceleration running.

Further, when the vehicle speed at the time of inputting the second downshift command is lower than or equal to the vehicle speed at the time of inputting the first downshift command, successive downshift is allowed in a vehicle speed region where the deceleration is small, so that a desired deceleration feel can be obtained and the range of choice to the vehicle operation can be widened.

DETAILED DESCRIPTION OF THE PREFERRED EMBODIMENTS

Figure 1:
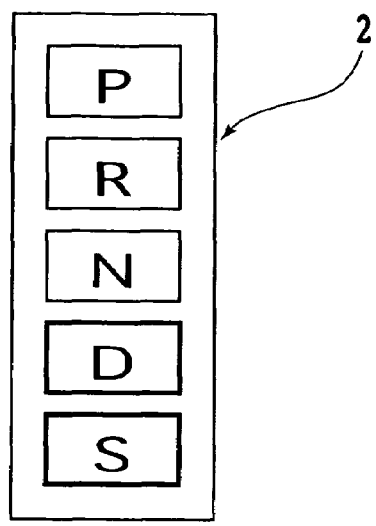
FIG. 1 is a view showing a shift position of a shift lever.

A preferred embodiment of the present invention will now be described in detail with reference to the drawings. Referring to FIG. 1, there is shown a shift position 2 of a shift lever suitably adoptable in the present invention. As well known in the art, P, R, and N denote a parking range, a reverse range, and a neutral range, respectively. Further, D denotes a drive range, wherein when the shift lever is in the drive range (D range), the shift mode in an automatic transmission becomes an automatic shift mode where a gear position or gear ratio to be set is determined according to a vehicle running condition. On the other hand, S denotes a sport range or manual shift range where manual-like running can be obtained in the automatic transmission.

Figure 2:
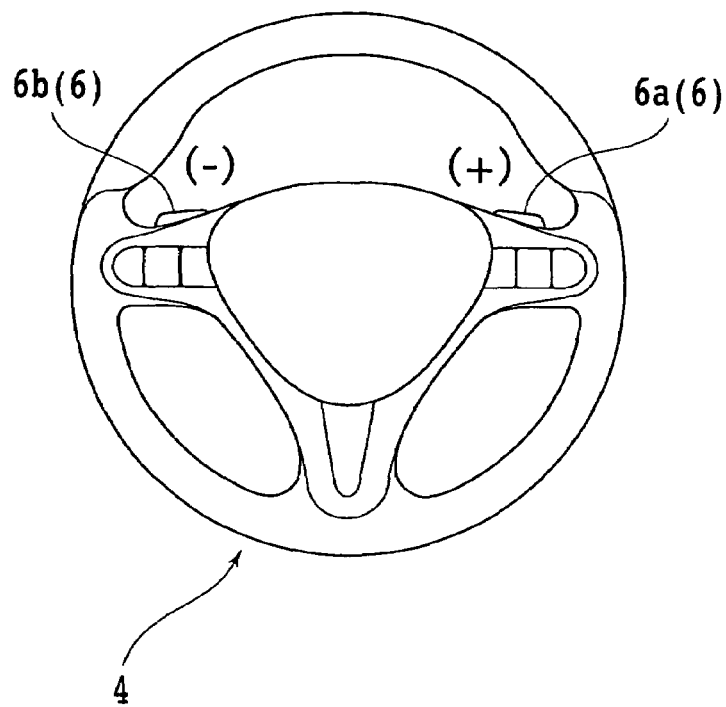
FIG. 2 is a view showing a paddle switch provided on a steering wheel.

FIG. 2 shows a paddle switch 6 provided on a steering wheel 4. The paddle switch 6 has an upshift switch 6a and a downshift switch 6b. When the shift lever is shifted to the sport range (S range), the automatic shift mode is shifted to a manual shift mode. Further, when the paddle switch 6 is operated, manual shift can be performed. More specifically, every time the upshift switch 6a is depressed, the gear position is sequentially upshifted, whereas every time the downshift switch 6b is depressed, the gear position is sequentially downshifted. Thus, shift control as in a manual transmission can be performed.

In such a paddle shift mode in the S range, upshift is allowed in a predetermined range where engine stall does not occur, and downshift is allowed in a predetermined range where engine over-revolution does not occur. Thus, in this S range paddle shift mode, a gear position (gear ratio) selected by the paddle switch 6 can be held, thereby realizing operability as in a manual transmission and making it suitable for sport running.

When the paddle switch 6 is operated in the condition where the shift lever is kept in the D range, the shift mode is shifted to a D range paddle shift mode, which is a shift mode capable of responding to operator demands to some extent. For example, in performing a decelerating operation frequently arising during running, the operator can do this operation in a one-action manner without taking the operator's hands off the steering wheel. In other words, the D range paddle shift mode makes it possible to perform upshift or downshift in the D range by the paddle switch 6 adapted to be operated by the operator in a one-action manner for the purpose of improving both fuel economy and engine performance. In this D range paddle shift mode, kick-down is allowed by rapidly depressing an accelerator pedal. Further, in the case of determining a vehicle cruising condition to be hereinafter described, the D range paddle shift mode is automatically returned to the automatic shift mode in the D range.

Figure 3A:
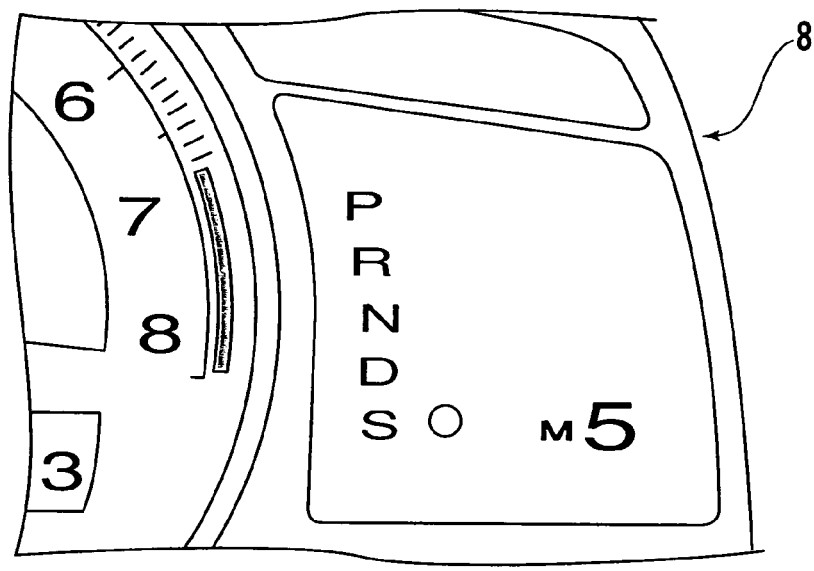
FIG. 3A is a view showing an example of indication at a meter portion in an S range paddle shift mode.
Figure 3B:
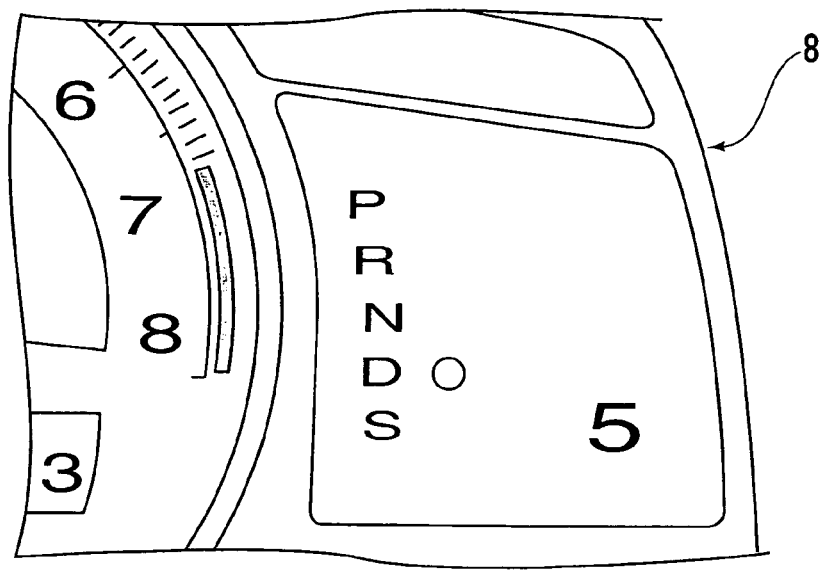
FIG. 3B is a view showing an example of indication at the meter portion in a D range paddle shift mode.

Referring to FIGS. 3A and 3B, there are shown examples of indication at a meter portion of an instrument panel 8 suitably adoptable in the shift control of the present invention. FIG. 3A shows an example of indication in the S range paddle shift mode. In this example, a fifth gear position is selected in the S range paddle shift mode, wherein an indication lamp corresponding to the sign "S" is turned on, and a sign "M5" is indicated. FIG. 3B shows an example of indication in the D range paddle shift mode. In this example, a fifth gear position is selected in the D range paddle shift mode, wherein an indication lamp corresponding to the sign "D" is turned on, and a sign "5" is indicated.

Figure 4:
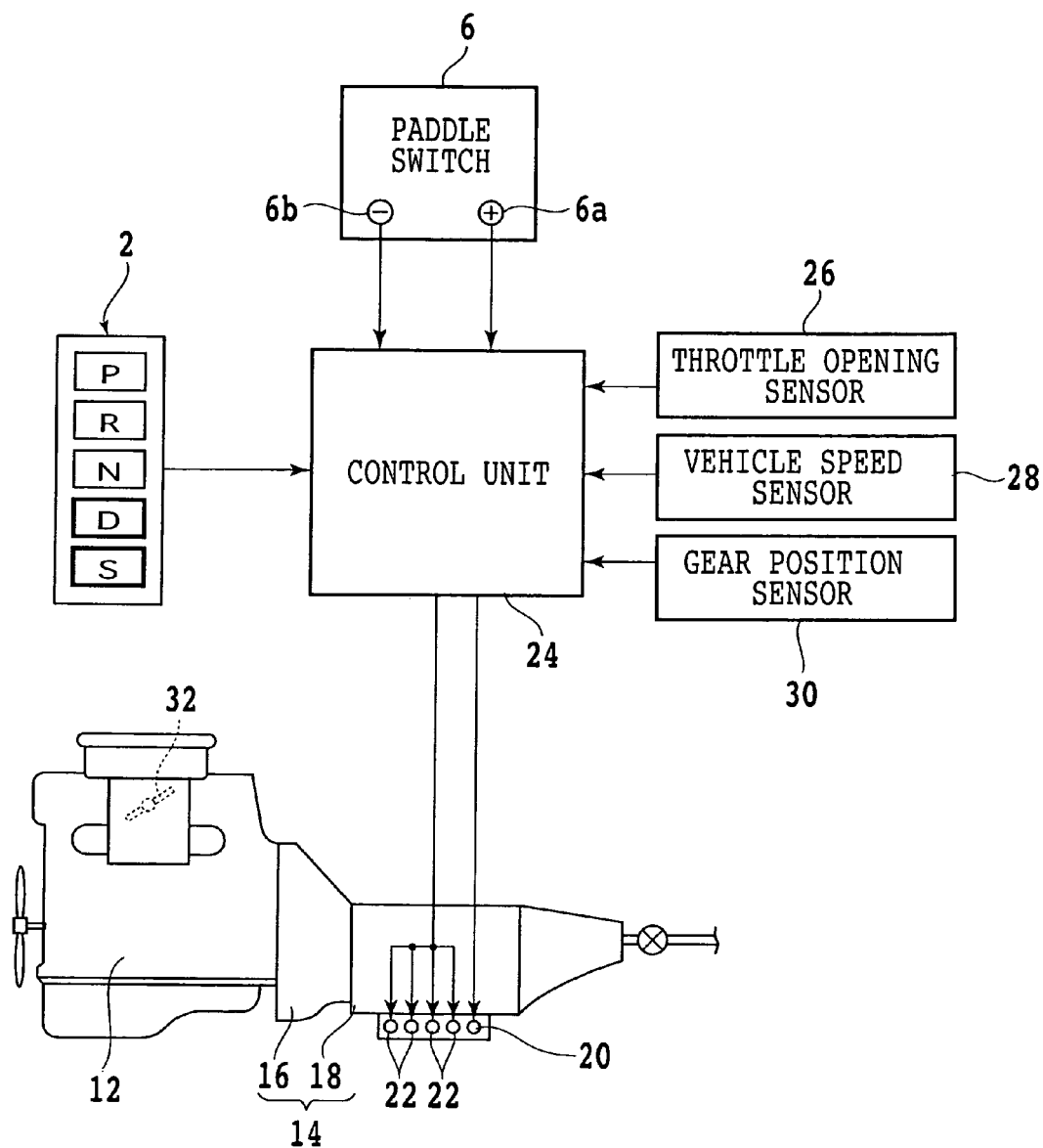
FIG. 4 is a schematic diagram showing a general configuration of a shift control apparatus according to the present invention.

FIG. 4 is a schematic diagram showing a general configuration of a shift control apparatus according to the present invention. In FIG. 4, reference numerals 12 and 14 denote an engine and an automatic transmission, respectively. An output from the engine 12 is transmitted through the automatic transmission 14 to drive wheels (not shown). The automatic transmission 14 is composed of a torque converter 16 and a multispeed change gear drive or gear mechanism 18. The torque converter 16 is provided with a lockup clutch (not shown). The lockup clutch is engaged or disengaged by controlling a solenoid 20 for lockup.

The multispeed change gear drive 18 has five gear positions for forward running, and as well known in the art a desired one of these gear positions can be set by changing the combination of energization and de-energization of a plurality of solenoids 22 for gear shift as shift operating means. Each of these solenoids 20 and 22 functions to switch the operational modes of a hydraulic actuator for lockup or gear shift. Reference numeral 24 denotes an electronic control unit (ECU) using a microcomputer, and signals from a throttle opening sensor 26, a vehicle speed sensor 28, and a gear position sensor 30 are input into the control unit 24. The throttle opening sensor 26 functions to detect an opening angle of a throttle valve 32, i.e., a throttle angle. The vehicle speed sensor 28 functions to detect a vehicle speed, and the gear position sensor 30 functions to detect a present gear position in the automatic transmission 14.

Further, a selected range in the shift lever position 2 is input into the control unit 24, and a signal from the upshift switch 6a or the downshift switch 6b of the paddle switch 6 is also input into the control unit 24. The control unit 24 outputs an on/off control signal to the solenoid 20 for the lockup clutch and a shift control signal to each solenoid 22.

The control unit 24 basically includes a CPU, ROM, RAM, and clock (soft timer), and further includes an A/D converter or D/A converter and an input/output interface. Such a configuration is well known in the case of using a microcomputer, so the description thereof will be omitted herein.

Figure 5:
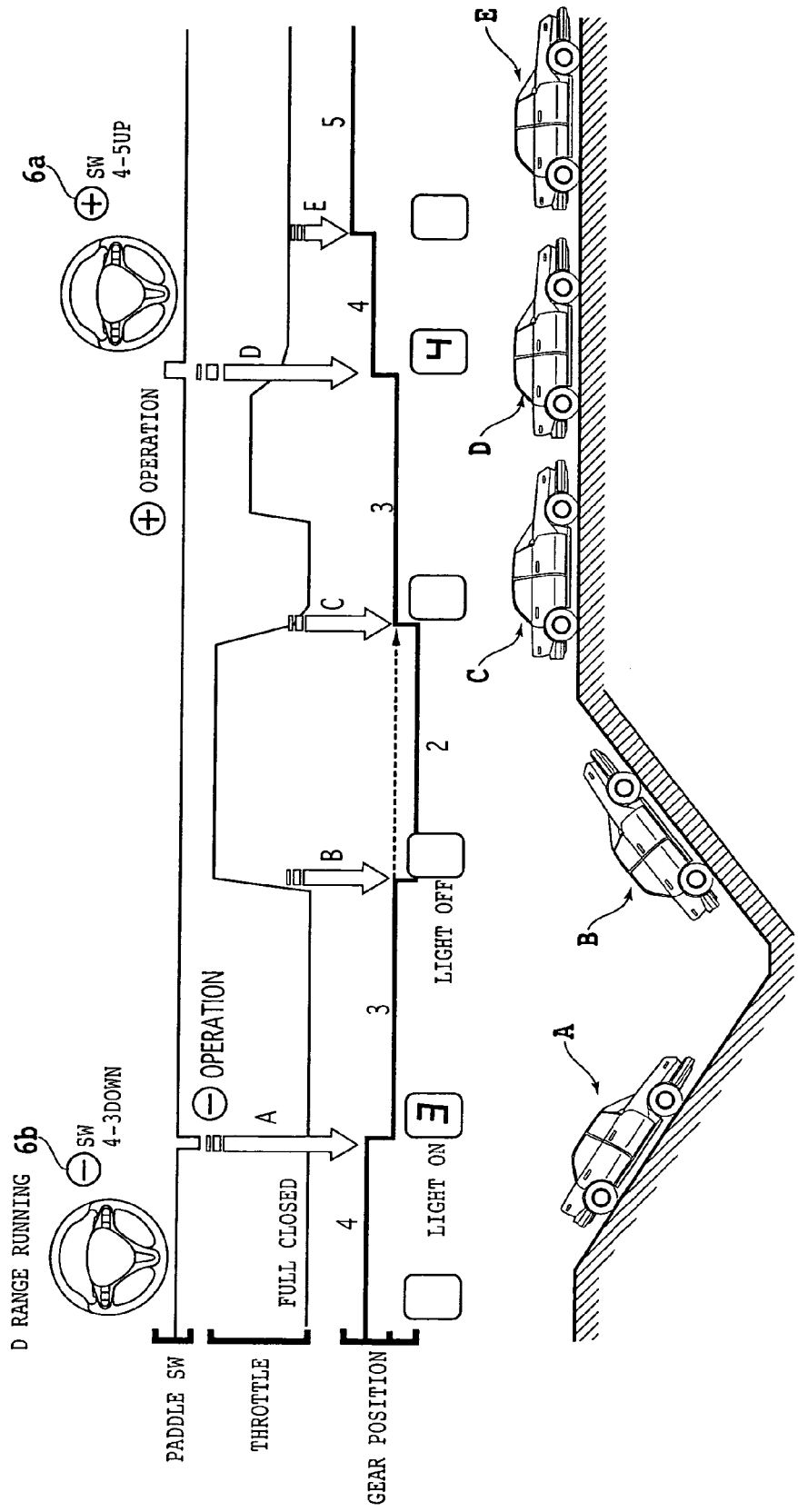
FIG. 5 is a schematic diagram for illustrating a general outline of D range paddle shift control.

A general outline of the D range paddle shift control will now be described with reference to FIG. 5. It is assumed that the shift lever is in the D range and that the vehicle is running with the fourth gear position in the condition where the gas pedal or accelerator pedal is not depressed or throttle is fully closed. When the downshift switch 6b is depressed at the stage A, the automatic shift mode is shifted to the D range paddle shift mode and the fourth gear position is downshifted to the third gear position. At this time, a seven-segment lamp provided at the indication meter portion on the instrument panel is turned on to indicate the sign "3." When the accelerator pedal is depressed at the next stage B, kick-down is effected to downshift the third gear position to the second gear position. At this time, the seven-segment lamp is turned off.

When a depression force applied to the accelerator pedal is removed at the next stage C, the second gear position is automatically upshifted to the previously held gear position, or the third gear position. When the upshift switch 6a is depressed at the next stage D, the third gear position is upshifted to the fourth gear position. At this time, the seven-segment lamp is turned on to indicate the sign "4." When it is determined that the vehicle is in the cruising condition at the stage E, this D range paddle shift mode is automatically returned to the automatic shift mode in the D range, and the fourth gear position is automatically upshifted to the fifth gear position. At this time, the seven-segment lamp is turned off.

The D range paddle shift control of the present invention is characterized in that (1) upshift or downshift is allowed by performing a paddle switch operation in a one-action manner in the D range, that (2) kick-down can be effected also in the D range paddle shift mode, and that (3) the D range paddle shift mode is automatically returned to the automatic shift mode in the D range when the vehicle cruising condition is determined.

The D range paddle shift control is greatly effective under the following running conditions.

(a) Light deceleration is required when the distance between the vehicle and another one ahead becomes smaller.
(b) Light deceleration is required before cornering.
(c) Strong deceleration by the combination with a brake pedal is required.

Figure 6:
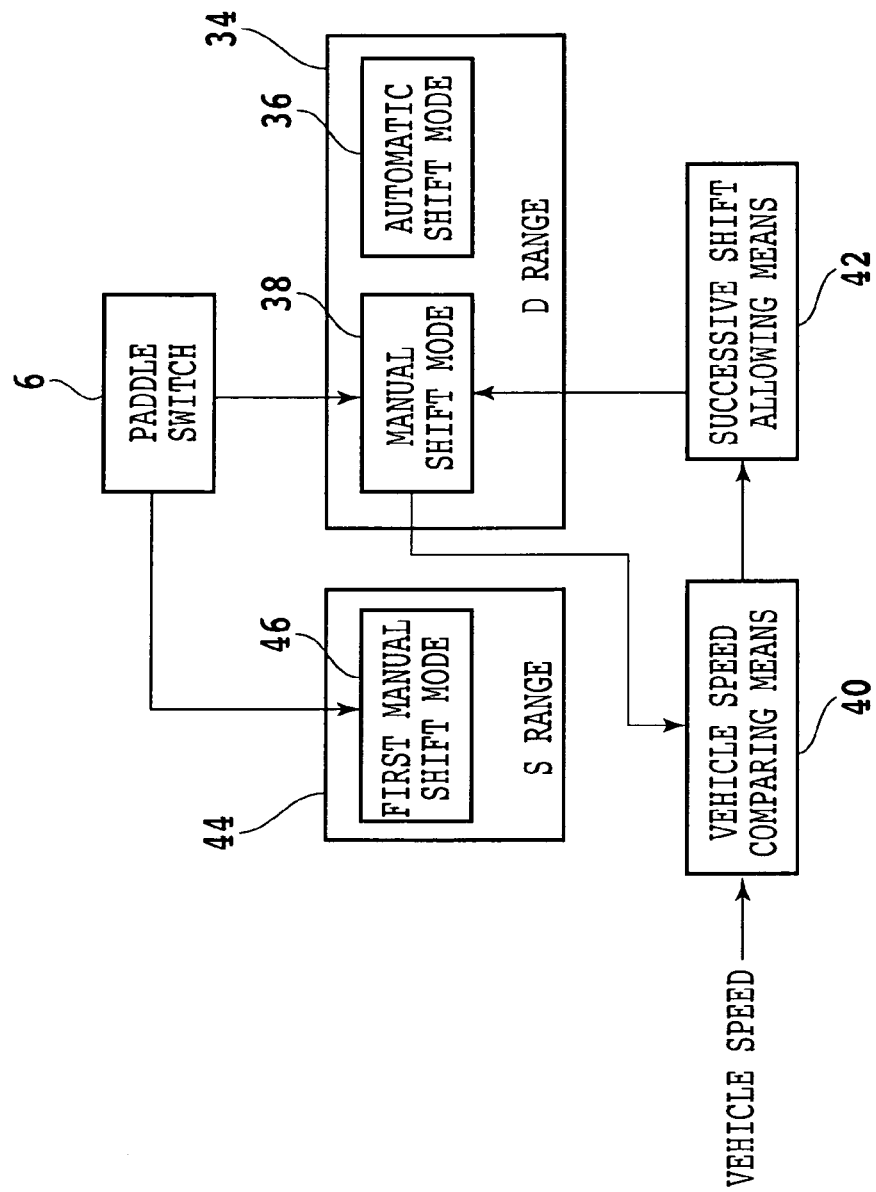
FIG. 6 is a block diagram showing the principle of the present invention.

While the general outline of the D range paddle shift control has been described above, an essential part of this control according to the present invention will now be described with reference to FIG. 6 showing the principle of the present invention. Referring to FIG. 6 which is a block diagram showing the principle of the present invention, the shift control apparatus for the automatic transmission according to the present invention has a D range 34 including an automatic shift mode 36 for performing a shift operation by determining a gear position or gear ratio to be set according to a vehicle running condition and a manual shift mode 38 for performing a shift operation instructed by a manual operation by an operator.

Vehicle speed comparing means 40 compares a vehicle speed at the time of inputting a first manual shift command for downshift to a predetermined gear position or gear ratio in the manual shift mode 38 and a vehicle speed at the time of inputting a second manual shift command for downshift in the same direction as that of the first manual shift command during a first shift control period from the time of inputting the first manual shift command to the time of completing first shift control according to the first manual shift command. Successive shift allowing means 42 allows the downshift by the second manual shift command when the vehicle speed comparing means 40 has determined that the vehicle speed at the time of inputting the second manual shift command is lower than or equal to the vehicle speed at the time of inputting the first manual shift command.

S range 44 is provided with a first manual shift mode 46 for performing a shift operation instructed by a manual operation such that a manual shift range (S range) is selected by the operator and an upshift switch 6a or a downshift switch 6b is operated by the operator in the manual shift range. The manual shift mode 38 in the D range 34 is a second manual shift mode for performing a shift operation instructed by a manual operation such that an automatic shift range (D range) is selected by the operator and the upshift switch 6a or the downshift switch 6b is operated by the operator in the automatic shift range.

According to the present invention, double (two-step) downshift is allowed in only a vehicle speed region where a deceleration feel does not become excessive, so that the generation of an excessive deceleration feel due to the downshift by an unintentional manual shift command is prevented.

The first manual shift mode 46 is a mode where the manual shift range (S range) is first selected by the operator and the upshift switch 6a or the downshift switch 6b is next operated, so that this mode can respond to operator demands to the maximum extent. Accordingly, the first manual shift mode 46 can respond to operator demands in a vehicle speed region where engine stall and engine over-revolution can be prevented. In contrast, the second manual shift mode 38 is a mode where the automatic shift range (D range) is first selected by the operator and the upshift switch 6a or the downshift switch 6b is next operated, so that this mode can respond to operator demands to some extent.

In the second manual shift mode 38, when the present vehicle speed is lower than or equal to the vehicle speed at the time of inputting the first downshift command, successive downshift is allowed. In case that the present vehicle speed during downhill running for example becomes higher than the vehicle speed at the time of performing the first downshift, there is a possibility that the next downshift may cause the approach to engine over-revolution and that an excessive deceleration feel may be given. To eliminate this possibility, the present gear position or gear ratio is maintained to continue deceleration running. In the second manual shift mode 38, a narrower region for allowing a successive downshift is defined than in the first manual shift mode 46.

When the vehicle speed at the time of inputting the second downshift command is lower than or equal to the vehicle speed at the time of inputting the first downshift command, successive downshift is allowed in a vehicle speed region where the deceleration is small, so that a desired deceleration feel can be obtained. Further, by providing two manual shift modes including the first mode capable of highly responding to operator demands and the second mode capable of sufficiently responding to operator demands, the range of choice to the vehicle operation can be widened.

Figure 7:
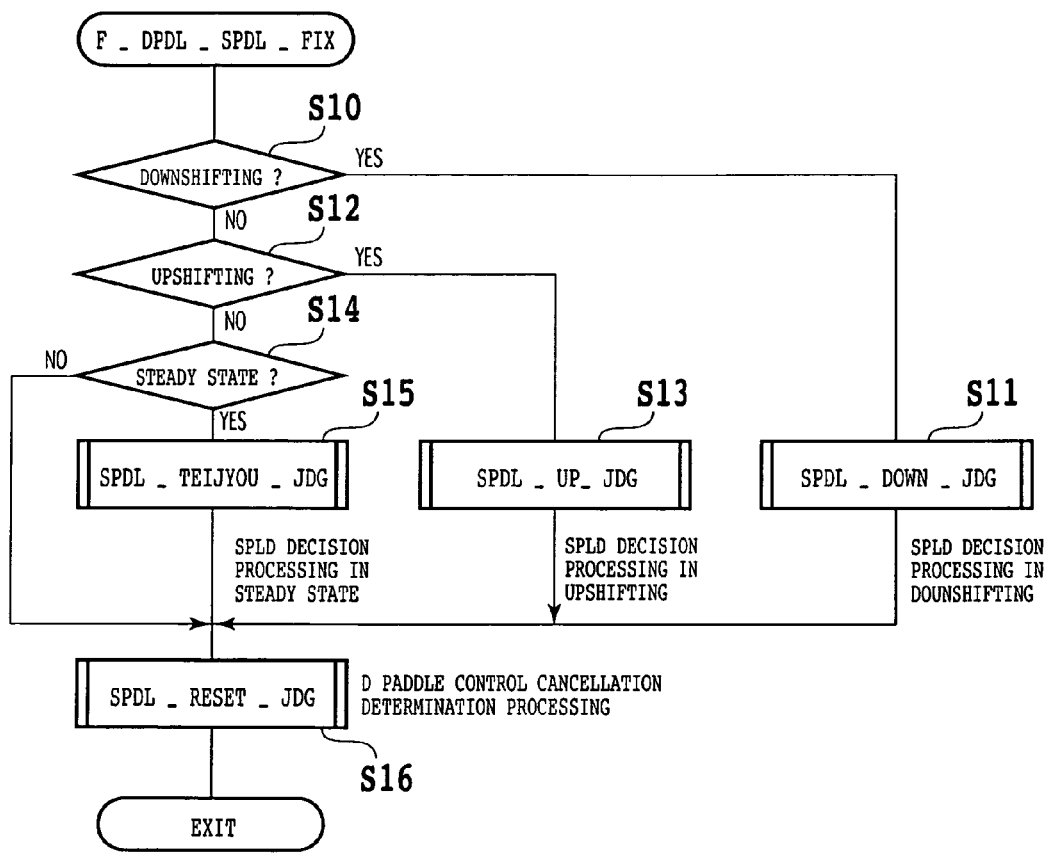
FIG. 7 is a flowchart showing a main routine of the D range paddle shift control.

The overall control of D range paddle shift according to the present invention will now be described with reference to the flowcharts shown in FIGS. 7 to 14. FIG. 7 is a flowchart showing a main routine of the D range paddle shift control according to the present invention. In step S10, it is determined whether or not downshift is being performed. If the answer in step S10 is affirmative, the program proceeds to step S11 to execute SPDL (target gear position by the D paddle control) decision processing in downshifting.

If the answer in step S10 is negative, the program proceeds to step S12 to determine whether or not upshift is being performed. If the answer in step S12 is affirmative, the program proceeds to step S13 to execute SPDL decision processing in upshifting. If the answer in step S12 is negative, the program proceeds to step S14 to determine whether or not the transmission is in steady state. If the answer in step S14 is affirmative, the program proceeds to step S15 to execute SPDL decision processing in steady state. If the answer in step S14 is negative, or if the processing of step S11, S13, or S15 is ended, the program proceeds to step S16 to execute D paddle control cancellation determination processing.

Figure 8:
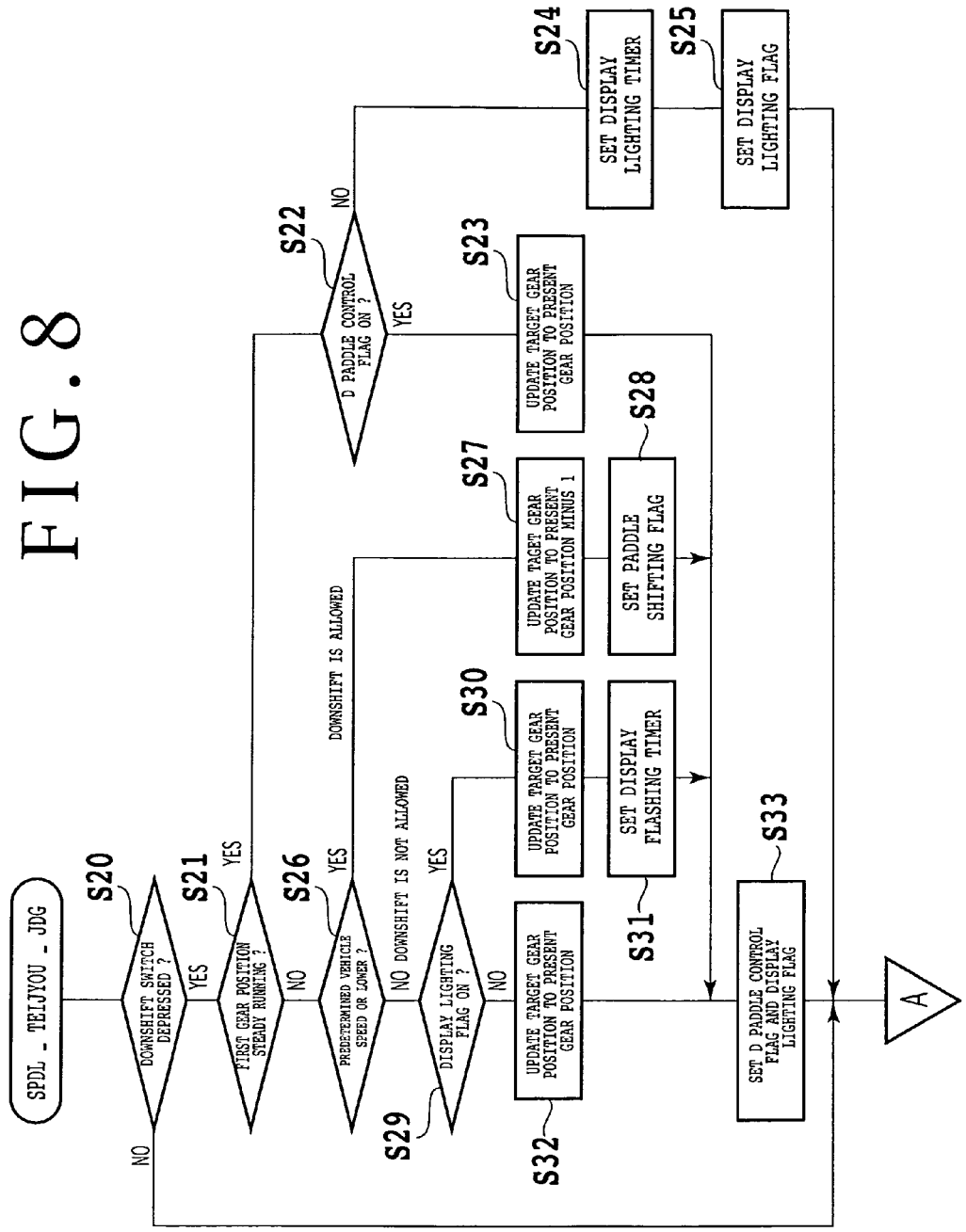
FIGS. 8 and 9 are flowcharts showing SPDL (target gear position by the D paddle control) decision processing in steady state.

The SPDL decision processing in steady state will now be described with reference to the flowcharts shown in FIGS. 8 and 9. In step S20, it is determined whether or not the downshift switch 6b has been depressed. If the downshift switch 6b has been depressed, D paddle hold control is performed. In this control, the normal upshift characteristic line is displaced by a predetermined amount toward higher vehicle speeds. Further, when the vehicle running condition becomes a condition where an upshift signal is to be output, the output of the upshift signal is delayed by a predetermined time period. Further, when the above condition where the upshift signal is to be output continues after the elapse of the predetermined time period, the output of the upshift signal is once allowed.

If the answer in step S20 is affirmative, the program proceeds to step S21 to determine whether or not the vehicle is running at the first gear position in the steady state. If the answer in step S21 is affirmative, the program proceeds to step S22 to determine whether or not a D paddle control flag is on, i.e., whether or not the D paddle control is being performed. If the answer in step S22 is negative, the program proceeds to step S24 to set a seven-segment display lighting timer for determining a display lighting time period and next proceeds to step S25 to set a seven-segment display lighting flag. Then, the seven-segment display provided at the meter portion on the instrument panel is flashed to indicate the sign "1."

If the answer in step S22 is affirmative, the program proceeds to step S23 to update the paddle shift target gear position to the present gear position. In other words, during the first gear position steady running of the vehicle, downshift by the operation of the downshift switch 6b is naturally inhibited regardless of whether or not the D paddle control is being performed.

If the answer in step S21 is negative, the program proceeds to step S26 to determine whether or not the present vehicle speed is lower than or equal to a predetermined vehicle speed. This predetermined vehicle speed is different according to gear position. At each gear position, this predetermined vehicle speed is a vehicle speed at which engine over-revolution upon downshifting can be prevented. If the answer in step S26 is affirmative, downshift is allowed and the program proceeds to step S27 to update the paddle shift target gear position to the present gear position minus 1 and next proceeds to step S28 to set a paddle shifting flag.

If the answer in step S26 is negative, i.e., if the present vehicle speed is higher than the predetermined vehicle speed, the program proceeds to step S29 to determine whether or not the seven-segment display lighting flag is on, i.e., whether or not the seven-segment display is on. If the answer in step S29 is affirmative, the program proceeds to step S30 to update the paddle shift target gear position to the present gear position and next proceeds to step S31 to set a seven-segment display flashing timer, thereby flashing the seven-segment display.

If the answer in step S29 is negative, the program proceeds to step S32 to update the paddle shift target gear position to the present gear position. After executing the step S23, S28, S31, or S32, the program proceeds to step S33 to set the D paddle control flag and the seven-segment display lighting flag.

Figure 9:
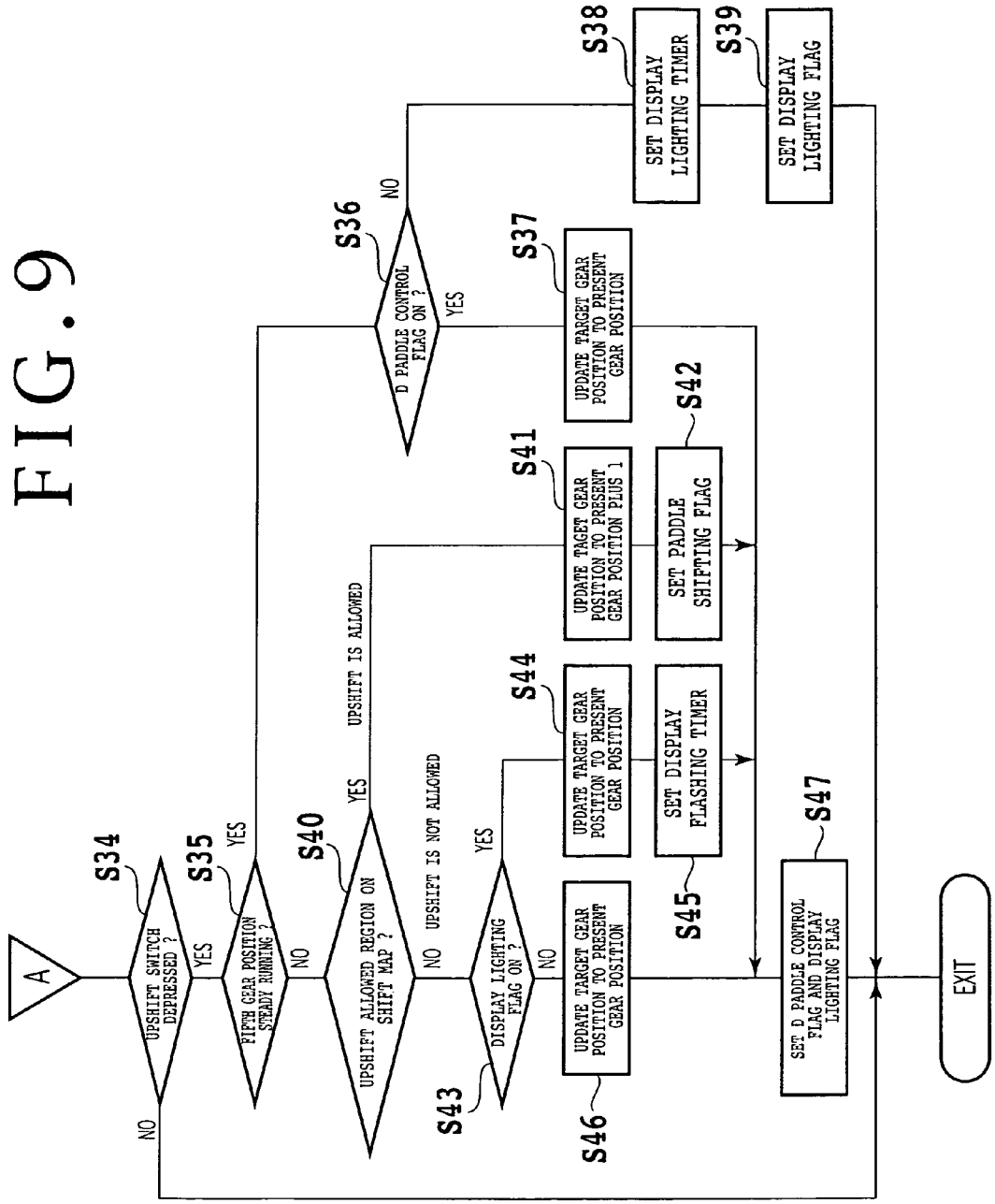

The program next proceeds to step S34 shown in FIG. 9 to determine whether or not the upshift switch 6a has been depressed. If the answer in step S34 is affirmative, the program proceeds to step S35 to determine whether or not the vehicle is running at the fifth gear position in the steady state. If the answer in step S35 is affirmative, the program proceeds to step S36 to determine whether or not the D paddle control flag is on, i.e., whether or not the D paddle control is being performed.

If the answer in step S36 is negative, the program proceeds to step S38 to set the seven-segment display lighting timer and next proceeds to step S39 to set the seven-segment display lighting flag. Then, the seven-segment display is flashed to indicate the sign "5." If the answer in step S36 is affirmative, the program proceeds to step S37 to update the paddle shift target gear position to the present gear position, or the fifth gear position.

If the answer in step S35 is negative, the program proceeds to step S40 to determine whether or not the vehicle running condition is in an upshift allowed region on the shift map. In other words, letting S2 denote the highest gear position attainable on the shift map and SH denote the present gear position, it is determined whether or not $S2 \geq SH+1$. In this preferred embodiment, upshift is allowed in a higher vehicle speed region with respect to the downshift line on the shift map to thereby expand the early upshift allowed region. If $S2 \geq SH+1$ in step S40, upshift is allowed and the program proceeds to step S41 to update the paddle shift target gear position to the present gear position plus 1 and next proceeds to step S42 to set the paddle shifting flag.

If $S2<SH+1$ in step S40, upshift is not allowed and the program proceeds to step S43 to determine whether or not the seven-segment display lighting flag is on. If the answer in step S43 is affirmative, the program proceeds to step S44 to update the paddle shift target gear position to the present gear position and next proceeds to step S45 to set the seven-segment display flashing timer, thereby flashing the seven-segment display to indicate the present gear position.

If the answer in step S43 is negative, the program proceeds to step S46 to update the paddle shift target gear position to the present gear position. After executing the step S37, S42, S45, or S46, the program proceeds to step S47 to set the D paddle control flag and the seven-segment display lighting flag. Then, this processing is ended.

Figure 10:
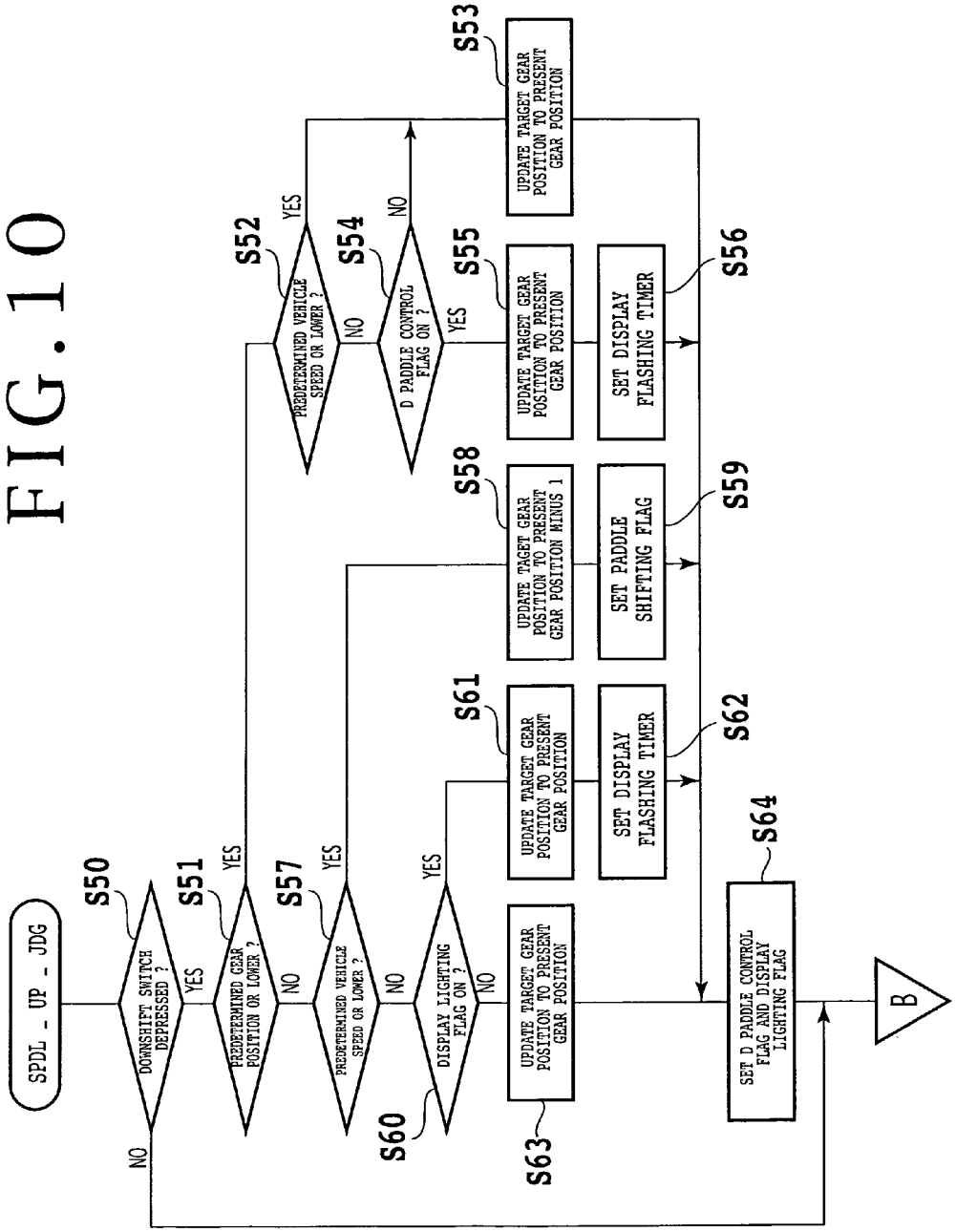
FIGS. 10 and 11 are flowcharts showing SPDL decision processing in upshifting.

The SPDL decision processing in upshifting will now be described with reference to the flowcharts shown in FIGS. 10 and 11. In step S50, it is determined whether or not the downshift switch 6b has been depressed. If the downshift switch 6b has been depressed, D paddle hold control is performed. In this control, the normal upshift characteristic line is displaced by a predetermined amount toward higher vehicle speeds. Further, when the vehicle running condition becomes a condition where an upshift signal is to be output, the output of the upshift signal is delayed by a predetermined time period. Further, when the above condition where the upshift signal is to be output continues after the elapse of the predetermined time period, the output of the upshift signal is once allowed.

If the answer in step S50 is affirmative, the program proceeds to step S51 to determine whether or not the present gear position is lower than or equal to a predetermined gear position. For example, this predetermined gear position is a second gear position. More specifically, if downshift is allowed in 1-2 upshifting, the behavior of the vehicle body becomes unstable. Therefore, downshift in 1-2 upshifting is not allowed. If the answer in step S51 is affirmative, the program proceeds to step S52 to determine whether or not the present vehicle speed is lower than or equal to a predetermined vehicle speed. If the answer in step S52 is affirmative, the program proceeds to step S53 to update the paddle shift target gear position to the present gear position. In other words, the present gear position is held.

If the answer in step S52 is negative, i.e., if the present vehicle speed is higher than the predetermined vehicle speed, the program proceeds to step S54 to determine whether or not the D paddle control flag is on, i.e., whether or not the D paddle control is being performed. If the answer in step S54 is negative, the program proceeds to step S53, whereas if the answer in step S54 is affirmative, the program proceeds to step S55 to update the paddle shift target gear position to the present gear position. In other words, the present gear position is held. The program next proceeds to step S56 to set the seven-segment display flashing timer. Then, the seven-segment display is flashed to indicate the present gear position.

If the answer in step S51 is negative, i.e., if the present gear position is higher than the predetermined gear position, the program proceeds to step S57 to determine whether or not the present vehicle speed is lower than or equal to a predetermined vehicle speed. This predetermined vehicle speed is different according to gear position as mentioned above in relation to step S26 in FIG. 8. If the answer in step S57 is affirmative, the program proceeds to step S58 to update the paddle shift target gear position to the present gear position minus 1. In other words, downshift is allowed. The program next proceeds to step S59 to set the paddle shifting flag.

If the answer in step S57 is negative, i.e., if the present vehicle speed is higher than the predetermined vehicle speed, downshift is not allowed to prevent engine over-revolution. In this case, the program proceeds to step S60 to determine whether or not the seven-segment display lighting flag is on, i.e., whether or not the seven-segment display is on. If the answer in step S60 is affirmative, the program proceeds to step S61 to update the paddle shift target gear position to the present gear position. In other words, the present gear position is held. The program next proceeds to step S62 to set the seven-segment display flashing timer. Then, the seven-segment display is flashed to indicate the present gear position.

If the answer in step S60 is negative, i.e., if the seven-segment display is off, the program proceeds to step S63 to update the paddle shift target gear position to the present gear position. In other words, the present gear position is held. After executing the step S53, S56, S59, S62, or S63, the program proceeds to step S64 to set the D paddle control flag and the seven-segment display lighting flag.

Figure 11:
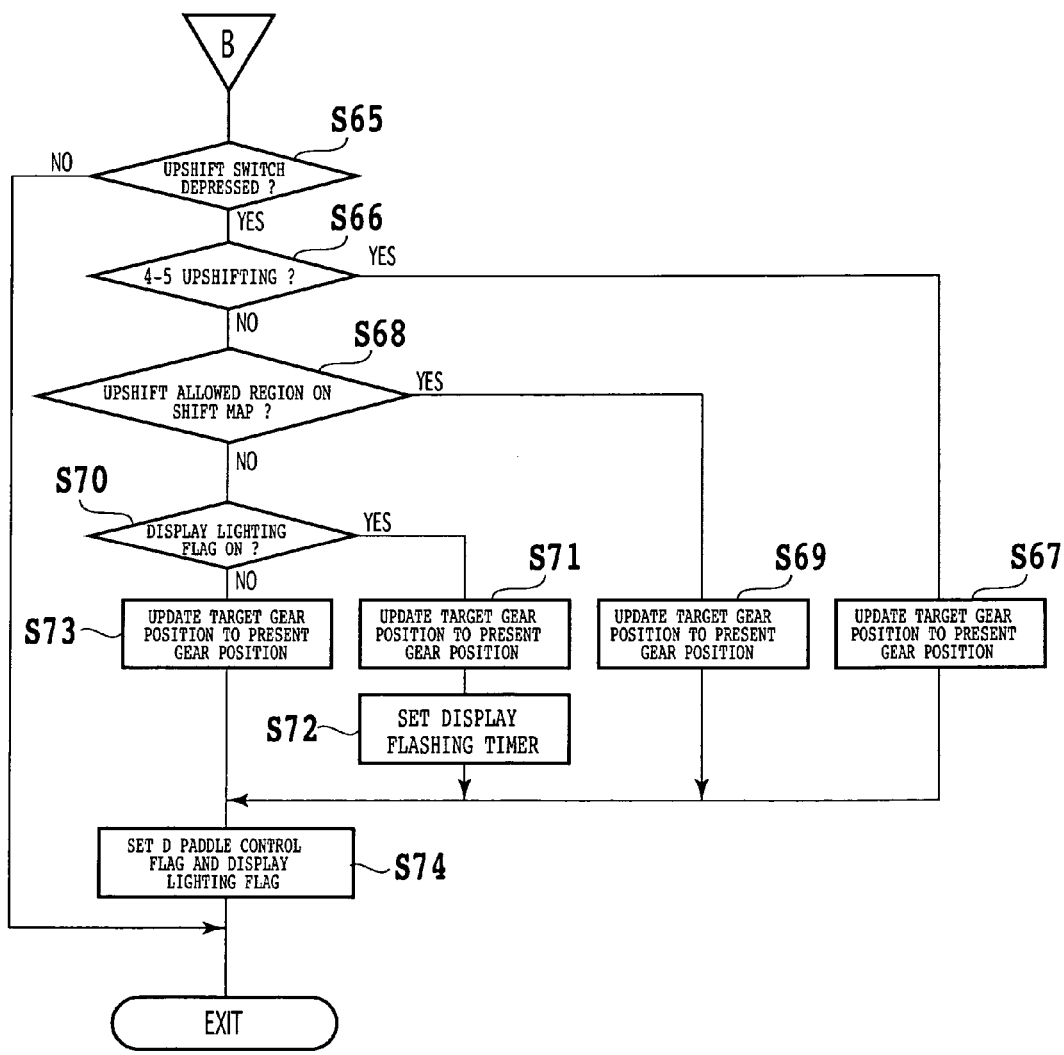

The program next proceeds to step S65 shown in FIG. 11 to determine whether or not the upshift switch 6a has been depressed. If the answer in step S65 is affirmative, the program proceeds to step S66 to determine whether or not 4-5 upshift in the automatic shift mode is being performed. If the answer in step S66 is affirmative, the program proceeds to step S67 to update the paddle shift target gear position to the present gear position. In other words, upshift by the upshift switch 6a during upshifting in the automatic shift mode is inhibited.

If the answer in step S66 is negative, the program proceeds to step S68 to determine whether or not the vehicle running condition is in an upshift allowed region on the shift map. In other words, it is determined whether or not S2≧SH+1. If the answer in step S68 is affirmative, the program proceeds to step S69 to update the paddle shift target gear position to the present gear position. In other words, even in the upshift allowed region, upshift by the paddle switch 6a is inhibited during upshifting in the automatic shift mode.

If the answer in step S68 is negative, the program proceeds to step S70 to determine whether or not the seven-segment display lighting flag is on, i.e., whether or not the seven-segment display is on. If the answer in step S70 is affirmative, the program proceeds to step S71 to update the paddle shift target gear position to the present gear position, and next proceeds to step S72 to set the seven-segment display flashing timer. Then, the seven-segment display is flashed to indicate the present gear position.

If the answer in step S70 is negative, the program proceeds to step S73 to update the paddle shift target gear position to the present gear position. After executing the step S67, S69, S72, or S73, the program proceeds to step S74 to set the D paddle control flag and the seven-segment display lighting flag. Then, this processing is ended.

Figure 12:
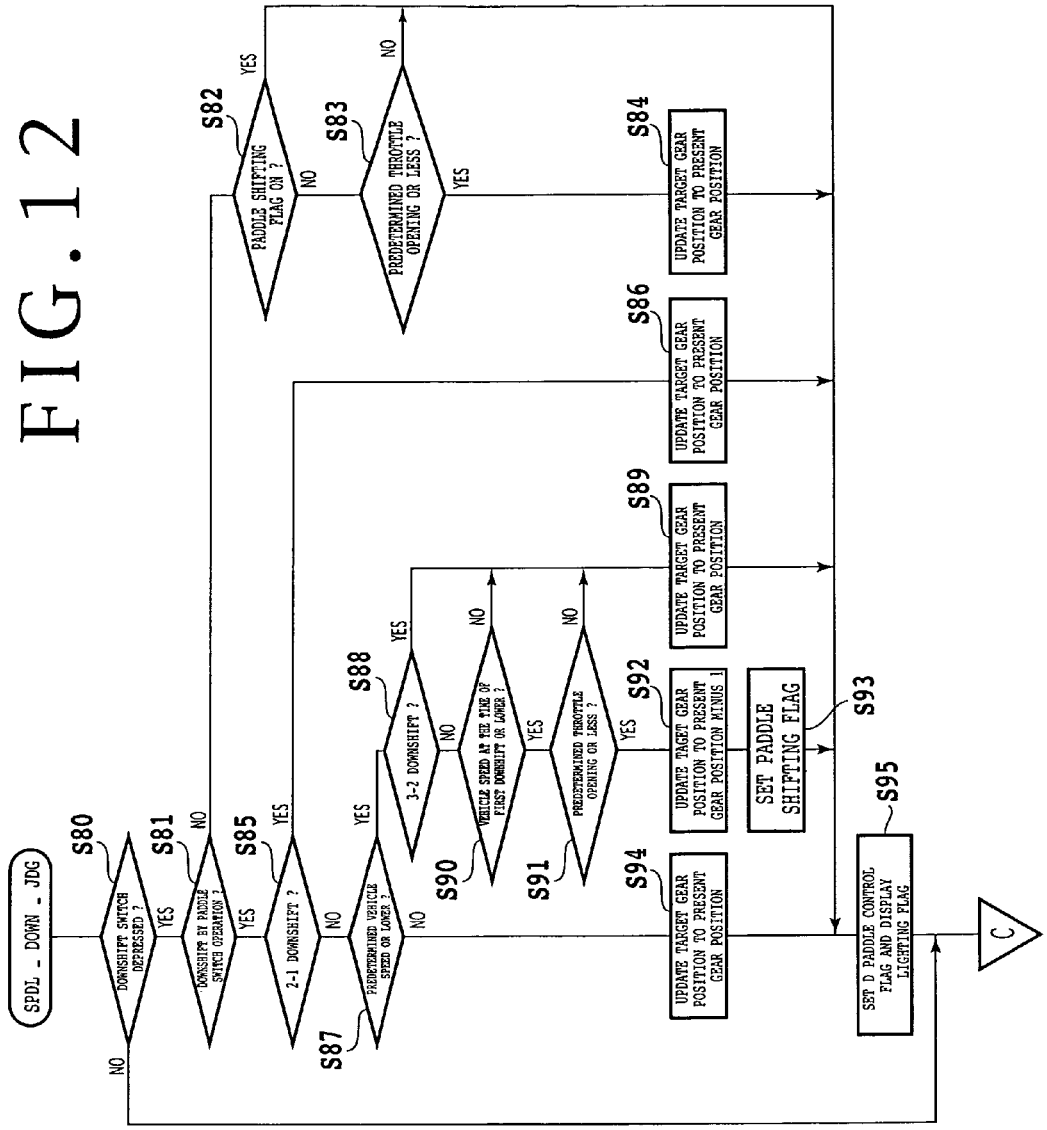
FIGS. 12 and 13 are flowcharts showing SPDL decision processing in downshifting.

The SPDL decision processing in downshifting will now be described with reference to the flowcharts shown in FIGS. 12 and 13. In step S80, it is determined whether or not the downshift switch 6b has been depressed. If the downshift switch 6b has been depressed, D paddle hold control is performed. In this control, the normal upshift characteristic line is displaced by a predetermined amount toward higher vehicle speeds. Further, when the vehicle running condition becomes a condition where an upshift signal is to be output, the output of the upshift signal is delayed by a predetermined time period. Further, when the above condition where the upshift signal is to be output continues after the elapse of the predetermined time period, the output of the upshift signal is once allowed.

If the answer in step S80 is affirmative, the program proceeds to step S81 to determine whether or not the present downshift is that by the paddle switch operation. If the answer in step S81 is negative, it is determined that the present downshift is automatic downshift according to the shift map or that downshift by the paddle switch operation is being awaited. In this case, the program proceeds to step S82 to determine whether or not the paddle shifting flag is on. If the answer in step S82 is affirmative, it is determined that downshift by the paddle switch operation is being awaited, whereas if the answer in step S82 is negative, it is determined that the present downshift is downshift in the automatic shift mode.

In the latter case, the program proceeds to step S83 to determine whether or not the throttle opening is less than or equal to a predetermined value. In other words, it is determined whether or not the accelerator pedal is nearly in a fully closed condition. If the answer in step S83 is affirmative, the program proceeds to step S84 to update the paddle shift target gear position to the present gear position.

If the answer in step S81 is affirmative, it is determined that the downshift switch 6b has been depressed twice, and the program proceeds to step S85 to determine whether or not the present downshift by the paddle switch is 2-1 downshift. If the answer in step S85 is affirmative, the program proceeds to step S86 to update the paddle shift target gear position to the present gear position, or the first gear position.

If the answer in step S85 is negative, it is determined that the present downshift by the paddle switch is any one of 3-2 downshift, 4-3 downshift, or 5-4 downshift. In this case, the program proceeds to step S87 to determine whether or not the present vehicle speed is lower than or equal to a predetermined vehicle speed. As mentioned above in relation to step S26 in FIG. 8, this predetermined vehicle speed is a vehicle speed at which engine over-revolution upon downshifting can be prevented, and it is different according to gear position.

If the answer in step S87 is affirmative, the program proceeds to step S88 to determine whether or not the present downshift by the paddle switch is 3-2 downshift. If the answer in step S88 is affirmative, the program proceeds to step S89 to update the paddle shift target gear position to the present gear position, or the second gear position. In other words, 3-1 downshift by the double depression of the paddle switch 6b is inhibited in order to eliminate the possibility of a large change in vehicle behavior.

If the answer in step S88 is negative, it is determined that the present downshift by the paddle switch is 4-3 downshift or 5-4 downshift. In this case, the program proceeds to step S90 to determine whether or not the present vehicle speed is lower than or equal to a vehicle speed at the time of the first downshift. If the answer in step S90 is affirmative, the program proceeds to step S91 to determine whether or not the throttle opening is less than or equal to a predetermined value. If the answer in step S91 is affirmative, the program proceeds to step S92 to update the paddle shift target gear position to the present gear position minus 1. In other words, 4-2 downshift or 5-3 downshift is allowed. The program next proceeds to step S93 to set the paddle shifting flag. If the answer in step S90 is negative or if the answer in step S91 is negative, the program proceeds to step S89 to update the paddle shift target gear position to the present gear position.

If the answer in step S87 is negative, downshift by the paddle switch is not allowed and the program proceeds to step S94 to update the paddle shift target gear position to the present gear position. After executing the step S84, S86, S89, S93, or S94, the program proceeds to step S95 to set the D paddle control flag and the seven-segment display lighting flag.

Figure 13:
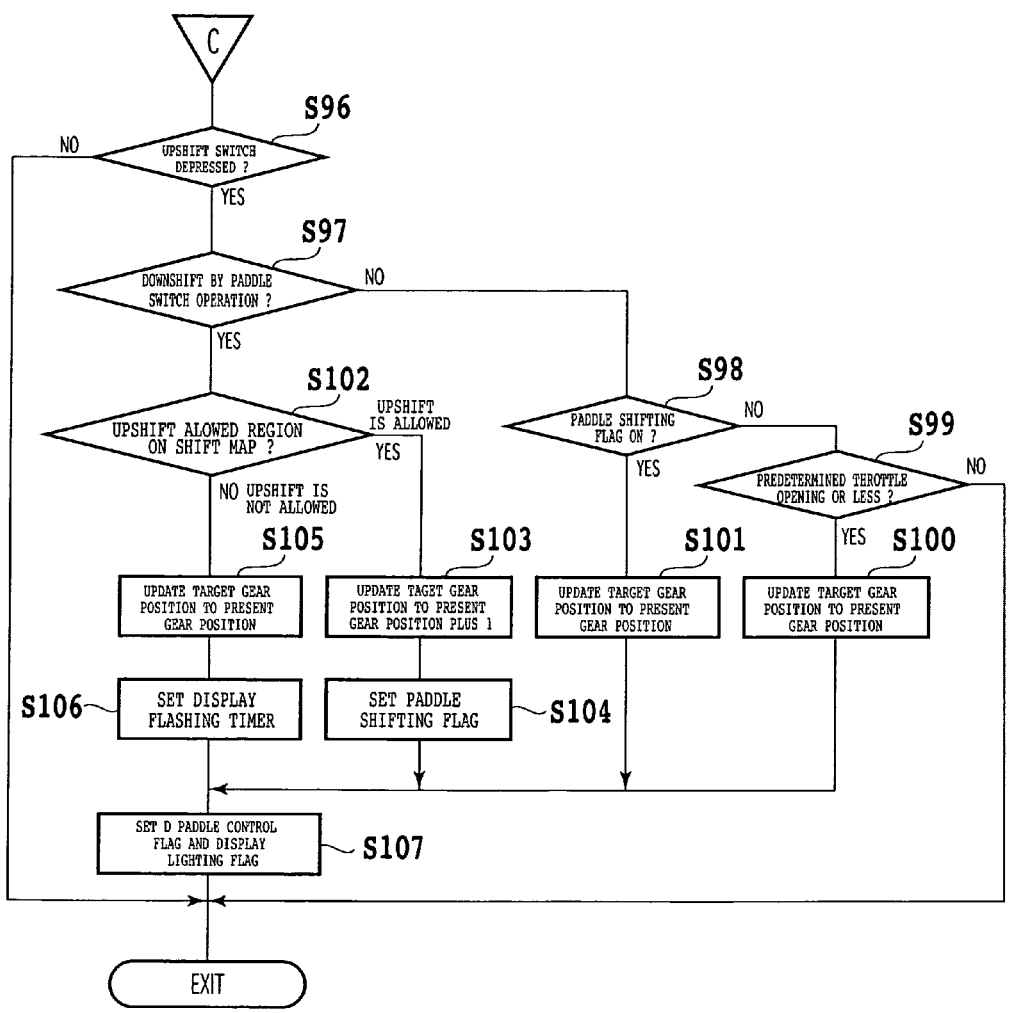

The program next proceeds to step S96 shown in FIG. 13 to determine whether or not the upshift switch 6a has been depressed. If the answer in step S96 is affirmative, the program proceeds to step S97 to determine whether or not the present downshift is downshift by the operation of the downshift switch 6b. If the answer in step S97 is negative, it is determined that the present downshift is automatic downshift according to the shift map or that downshift by the paddle switch operation is being awaited. In this case, the program proceeds to step S98 to determine whether or not the paddle shifting flag is on.

If the answer in step S98 is negative, it is determined that the present downshift is downshift in the automatic shift mode. In this case, the program proceeds to step S99 to determine whether or not the throttle opening is less than or equal to a predetermined value. In other words, it is determined whether or not the accelerator pedal is nearly in a fully closed condition. If the answer in step S99 is affirmative, upshift is not allowed and the program proceeds to step S100 to update the paddle shift target gear position to the present gear position. If the answer in step S98 is affirmative, it is determined that downshift by the paddle switch operation is being awaited. In this case, upshift is not allowed and the program proceeds to step S101 to update the paddle shift target gear position to the present gear position.

If the answer in step S97 is affirmative, the program proceeds to step S102 to determine whether or not the vehicle running condition is in an upshift allowed region on the shift map. In other words, it is determined whether or not S2≧SH+ 1. If the answer in step S102 is affirmative, the program proceeds to step S103 to update the paddle shift target gear position to the present gear position plus 1. In other words, in the case of 4-3 downshift, the target gear position is returned to the fourth gear position. The program next proceeds to step S104 to set the paddle shifting flag.

If the answer in step S102 is negative, upshift is not allowed and the program proceeds to step S105 to update the paddle shift target gear position to the present gear position and next proceeds to step S106 to set the seven-segment display flashing timer. Then, the seven-segment display is flashed to indicate the present gear position. After executing the step S100, S101, S104, or S106, the program proceeds to step S107 to set the D paddle control flag and the seven-segment display lighting flag. Then, this processing is ended.

Figure 14:
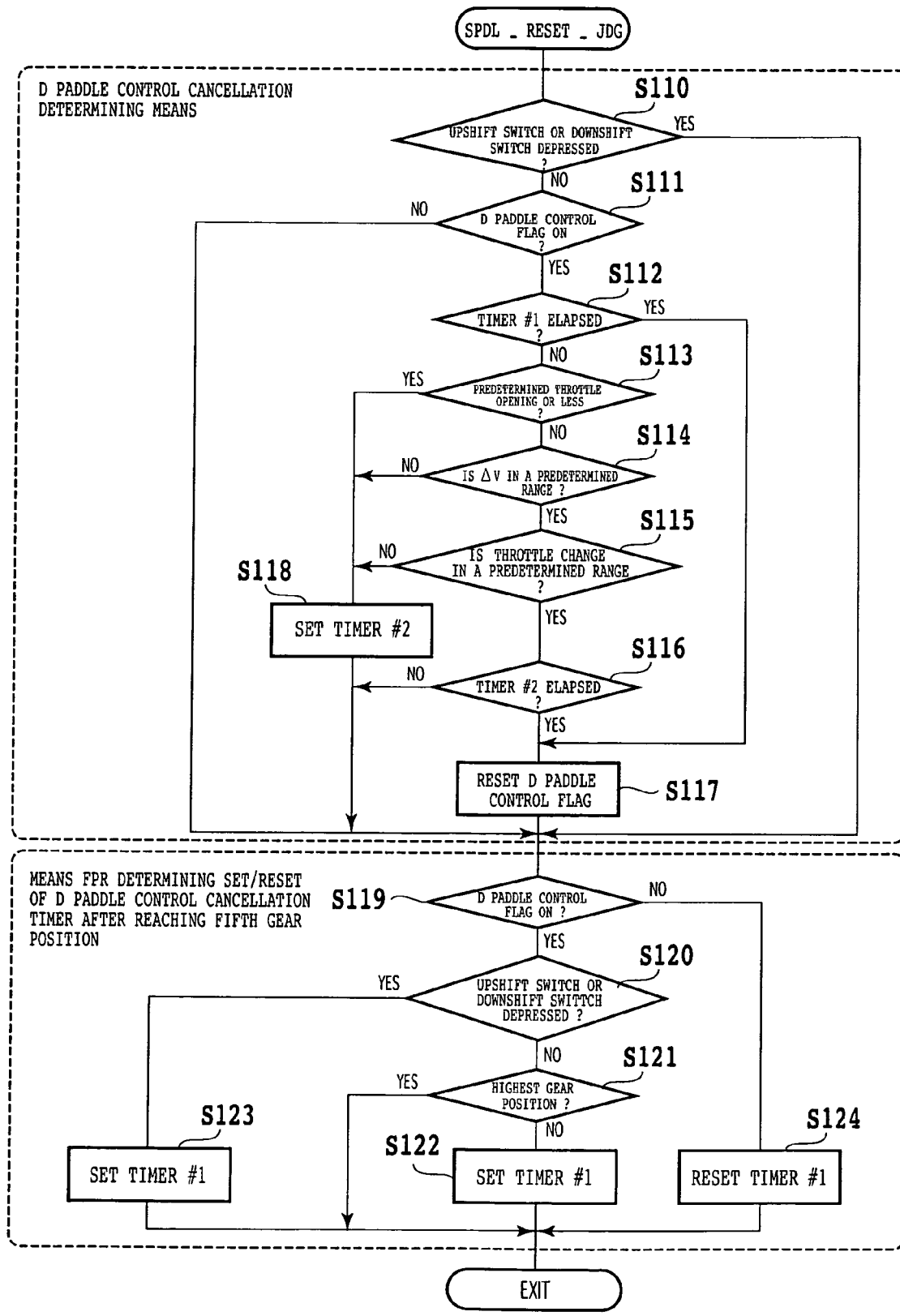
FIG. 14 is a flowchart showing D range paddle shift control cancellation determination processing.

The D paddle control cancellation determination processing will now be described with reference to the flowchart shown in FIG. 14. In step S110, it is determined whether or not the upshift switch 6a or the downshift switch 6b has been depressed. If the answer in step S110 is negative, the program proceeds to step S111 to determine whether or not the D paddle control is being performed, i.e., whether or not the D paddle control flag is on. If the answer in step S111 is affirmative, the program proceeds to step S112 to determine whether or not a timer #1 set to a predetermined time period has elapsed.

This timer #1 is a timer for canceling the control at the time of reaching the highest gear position. Every time the step S122 or S123 to be hereinafter described is executed, the timer #1 is set to the predetermined time period. In this preferred embodiment, the highest gear position is the fifth gear position. If the answer in step S112 is negative, the program proceeds to step S113 to determine whether or not the throttle opening is less than or equal to a predetermined value. If the answer in step S113 is negative, i.e., if the accelerator pedal has been depressed, the program proceeds to step S114 to determine whether or not the amount of change in vehicle speed (ΔV) is in a predetermined range.

If the answer in step S114 is affirmative, the program proceeds to step S115 to determine whether or not the amount of change in throttle opening is in a predetermined range. If the answer in step S115 is affirmative, the program proceeds to step S116 to determine whether or not a timer #2 set to a predetermined time period has elapsed. This timer #2 is a timer for canceling the control according to the cruising conditions. If the answer in step S113 is affirmative, if the answer in step S114 is negative, or if the answer in step S115 is negative, the program proceeds to step S118 to set the timer #2.

In other words, if the throttle opening is greater than the predetermined value, if the amount of change in vehicle speed is in the predetermined range, and if the amount of change in throttle opening is in the predetermined range, it is determined that the vehicle is in the cruising condition. If the answer in step S116 is affirmative, i.e., if the timer #2 set to the predetermined time period has elapsed after starting the cruising condition, the program proceeds to step S117 to reset the D paddle control flag and D paddle control related parameters and to restore the automatic shift mode. Also in the case that the timer #1 set to the predetermined time period has elapsed in step S112, the program proceeds to step S117 to cancel the D paddle control. In other words, when the timer #1 has elapsed after reaching the highest gear position, the D paddle control is canceled. The above-mentioned steps S110 to S118 constitute means for determining cancellation of the D paddle control.

If the answer in step S110 is affirmative or if the answer in step S111 is negative or after executing step S117 or S118, the program proceeds to step S119 to determine whether or not the D paddle control flag is on, i.e., whether or not the D paddle control is being performed. If the answer in step S119 is affirmative, the program proceeds to step S120 to determine whether or not the upshift switch 6a or the downshift switch 6b has been depressed.

If the answer in step S120 is negative, the program proceeds to step S121 to determine whether or not the gear position has reached the highest gear position (the fifth gear position in this preferred embodiment). If the answer in step S121 is negative, the program proceeds to step S122 to set the timer #1 to the predetermined time period, whereas if the answer in step S121 is affirmative, the program returns.

If the answer in step S120 is affirmative, the program proceeds to step S123 to set the timer #1 to the predetermined time period. If the answer in step S119 is negative, the program proceeds to step S124 to reset the timer #1. The above-mentioned steps S119 to S124 constitute means for determining set/reset of the D paddle control cancellation timer after reaching the fifth gear position.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A shift control apparatus for an automatic transmission having an automatic shift mode for performing a shift operation by determining a gear position or gear ratio to be set according to a vehicle running condition and a manual shift mode for performing a shift operation instructed by a manual operation by an operator, said shift control apparatus comprising:

vehicle speed comparing means for comparing a vehicle speed at the time of inputting a first manual shift command for downshift to a predetermined gear position or gear ratio in said manual shift mode and a vehicle speed at the time of inputting a second manual shift command for downshift in the same direction as that of said first manual shift command during a first shift control period from the time of inputting said first manual shift command to the time of completing first shift control according to said first manual shift command; and successive shift allowing means for allowing the downshift by said second manual shift command when said vehicle speed comparing means has determined that the vehicle speed at the time of inputting said second manual shift command is lower than or equal to the vehicle speed at the time of inputting said first manual shift command.

2. The shift control apparatus for an automatic transmission according to claim 1, wherein said manual shift mode comprises:

a first manual shift mode for performing a shift operation instructed by a manual operation such that a manual shift range is selected by the operator and an upshift switch or a downshift switch is operated by the operator in said manual shift range; and a second manual shift mode for performing a shift operation instructed by a manual operation such that an automatic shift range is selected by the operator and said upshift switch or said downshift switch is operated by the operator in said automatic shift range;

said successive shift allowing means operating in said second manual shift mode.

* * * * *